(12) United States Patent
Smith et al.

(10) Patent No.: US 7,004,635 B1
(45) Date of Patent: Feb. 28, 2006

(54) LUBRICATED BALL BEARINGS

(75) Inventors: James C. Smith, Salt Lake City, UT (US); Derrick Arnold, Salt Lake City, UT (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 10/150,171

(22) Filed: May 17, 2002

(51) Int. Cl.
F16C 33/32 (2006.01)

(52) U.S. Cl. .................................. 384/492; 384/913

(58) Field of Classification Search ............... 384/492, 384/912, 913; 378/132, 133
See application file for complete search history.

(56) References Cited

U.S. PATENT DOCUMENTS

| | | | |
|---|---|---|---|
| 3,198,735 A * | 8/1965 | Lamson et al. ............ 384/463 |
| 3,658,488 A * | 4/1972 | Brown et al. ............. 428/613 |
| 3,735,176 A | 5/1973 | Langer et al. |
| 3,855,492 A | 12/1974 | Langer et al. |
| 3,942,059 A | 3/1976 | Tran-Quang |
| 4,005,322 A | 1/1977 | Koller |
| 4,097,759 A * | 6/1978 | Furbee et al. ............ 378/128 |
| 4,097,760 A * | 6/1978 | Cinelli .................... 378/133 |
| RE30,082 E | 8/1979 | Atlee et al. |
| 4,187,442 A | 2/1980 | Hueschen et al. |
| 4,272,696 A | 6/1981 | Stroble et al. |
| 4,293,171 A * | 10/1981 | Kakumoto et al. ........ 384/492 |
| 4,470,645 A | 9/1984 | Lauwasser |
| 4,490,264 A * | 12/1984 | Gerkema et al. .......... 428/642 |
| 4,508,396 A * | 4/1985 | Doi et al. ................ 384/463 |
| 4,569,070 A * | 2/1986 | Schubert et al. .......... 378/132 |
| 4,797,011 A * | 1/1989 | Saeki et al. .............. 384/13 |
| 4,870,672 A | 9/1989 | Lindberg |
| 4,949,368 A | 8/1990 | Kubo |
| 4,953,190 A | 8/1990 | Kukoleck et al. |
| 4,956,858 A * | 9/1990 | Upadhya .................. 378/133 |
| 4,988,534 A | 1/1991 | Upadhya |
| 5,056,126 A | 10/1991 | Klostermann et al. |
| 5,139,876 A * | 8/1992 | Graham et al. .......... 428/411.1 |
| 5,148,463 A | 9/1992 | Woodruff et al. |
| 5,150,397 A | 9/1992 | Randzaao |
| 5,157,706 A | 10/1992 | Hohenauer |
| 5,159,619 A | 10/1992 | Benz et al. |
| 5,308,172 A | 5/1994 | Upadhya et al. |
| 5,351,786 A * | 10/1994 | Graham et al. .......... 184/6.22 |
| 5,414,748 A | 5/1995 | Upadhya |
| 5,516,214 A * | 5/1996 | Kakumoto et al. ........ 384/492 |

(Continued)

FOREIGN PATENT DOCUMENTS

JP 10241614 A * 9/1998

Primary Examiner—Thomas R. Hannon
(74) Attorney, Agent, or Firm—Workman Nydegger

(57) ABSTRACT

A lubricated ball bearing for use in ball bearing sets is disclosed. The lubricated ball bearing features a lubricating coating applied to its outer surface. The lubricating coating preferably comprises silver, and enables the ball bearing to be utilized in bearing assemblies environments where other lubricants may not be acceptably used, such as in the high vacuum environment of an x-ray tube. The lubricating coating is attached to the ball bearing via an intermediate bonding layer that is interposed between the outer surface of the ball bearing core and the lubricating coating. The intermediate bonding layer, preferably comprising nickel, is chemically bonded to both the ball bearing core and the lubricating coating. This produces a lubricating coating having a high-strength adhesion to the ball bearing such that flaking or degrading of the coating will not occur in the high heat, high vacuum environment of the x-ray tube during x-ray production.

38 Claims, 4 Drawing Sheets

U.S. PATENT DOCUMENTS

| | | |
|---|---|---|
| 5,553,114 A | 9/1996 | Siemers et al. |
| 5,636,708 A * | 6/1997 | Wedeven et al. ......... 184/6.22 |
| 5,838,762 A | 11/1998 | Ganin et al. |
| RE36,405 E | 11/1999 | Akita et al. |
| 6,007,251 A * | 12/1999 | Hayashida et al. ......... 384/492 |
| 6,011,829 A | 1/2000 | Panasik |
| 6,041,100 A | 3/2000 | Miller et al. |
| 6,125,168 A | 9/2000 | Bhatt |
| 6,125,169 A | 9/2000 | Wandke et al. |
| 6,144,720 A | 11/2000 | DeCou et al. |

* cited by examiner

LUBRICATED BALL BEARINGS

BACKGROUND OF THE INVENTION

1. Field of the Invention

The present invention generally relates to bearing assemblies. In particular the present invention relates to x-ray tube bearing assemblies having bearing surfaces that feature a thermally and mechanically stable lubricating coating that reduces flaking and spalling, thereby enhancing x-ray tube performance and longevity.

2. The Related Technology

X-ray producing devices are extremely valuable tools that are used in a wide variety of applications, both industrial and medical. For example, such equipment is commonly employed in areas such as medical diagnostic examination and therapeutic radiology, semiconductor manufacture and fabrication, and materials analysis.

Regardless of the applications in which they are employed, x-ray devices operate in similar fashion. X-rays are produced in such devices when electrons are emitted, accelerated, then impinged upon a material of a particular composition. This process typically takes place within an evacuated x-ray tube.

The evacuated x-ray tube typically includes a first housing portion that forms an evacuated enclosure. Typically, the evacuated enclosure is constructed of a heat-conductive material, such as copper. However, various materials, and combinations of materials, can be used.

Disposed within the evacuated enclosure is a cathode, or electron source, and an anode oriented to receive electrons emitted by the cathode. The anode can be stationary within the tube, or can be in the form of a rotating annular disk mounted to a rotor shaft that is rotatably supported by a bearing surface contained in a bearing assembly. The bearing assembly generally comprises a housing, a shaft, and ball bearing sets oriented to provide bearing surfaces for rotatably supporting the shaft. Each ball bearing set typically comprises several spherical ball bearings that are disposed between circular tracks, called races. The ball bearings are constrained to roll in the races between the bearing housing and bearing shaft, thereby enabling the bearing shaft to rotate within the housing. The rotor shaft, in turn, is operably connected to the bearing shaft so as to enable the rotor shaft and anode to rotate. The rotating anode, rotor shaft, and bearing assembly are therefore interconnected and comprise a few of the primary components of the rotor assembly.

In operation, an electric current is supplied to a filament portion of the cathode, which causes a stream of electrons to be emitted by thermionic emission. A high voltage potential placed between the cathode and anode causes the electrons to form a stream and accelerate toward a target surface located on the anode. Upon approaching and striking the target surface, some of the resulting kinetic energy is released in the form of electromagnetic radiation of very high frequency, i.e., x-rays. The specific frequency of the x-rays produced depends in large part on the type of material used to form the anode target surface. Target surface materials with high atomic numbers ("Z numbers") are typically employed. The x-rays are then collimated so that they exit the x-ray tube through a window in the tube, and enter the x-ray subject, such as a medical patient.

As discussed above, some of the kinetic energy resulting from the collision with the target surface results in the production of x-rays. However, much of the kinetic energy is released in the form of heat. Still other electrons simply rebound from the target surface and strike other "non-target" surfaces within the x-ray tube. These are often referred to as "backscatter" electrons. These backscatter electrons retain a significant amount of kinetic energy after rebounding, and when they also impact other non-target surfaces they impart large amounts of heat.

A substantial amount of heat generated from these target and non-target electron interactions is transmitted via the anode and rotor shaft to the bearing assembly and the ball bearing sets. If not manufactured to adequately withstand these temperatures, the one or more ball bearings that comprise the ball bearing set may prematurely fail, rendering the x-ray tube inoperable.

In addition to high temperatures, the ball bearings are also subjected to significant mechanical stress imposed by virtue of the high rate of rotation experienced by the ball bearing sets during tube operation. In some high powered tubes, for instance, the rotating anode, which is supported by the bearing assembly, may rotate at rates exceeding 3,600 revolutions per minute ("rpm"). The ball bearings must be strong enough to withstand the stress imposed by this rotation. If not, premature bearing failure is the likely result.

One way to alleviate the effects of the thermal and mechanical stress discussed above is through lubrication of the ball bearings. In addition to improving ball bearing performance, lubrication also reduces noise and friction within the ball bearing sets, which helps to ensure smooth anode rotation and proper tube operation. Because the bearing assembly is disposed within the vacuum environment of the tube's evacuated enclosure, however, traditional bearing lubricants, such as grease or graphite, may not be used. Instead, ball bearings disposed in such vacuum environments typically comprise a metallic core, such as steel, onto which a hardened lubricating coating is directly applied. The lubricating coating may comprise a metallic material, such as silver.

The lubricating coating has typically been applied directly to the ball bearing core using one of several methods. One method is known as potential-driven ion deposition. In this process, the ball bearing cores are placed in a charged gas chamber containing argon or similar gas. Metallic ions that will comprise the lubricating coating are driven by an electric current to impact the metallic ball cores, thereby plating the cores with a metallic coating. This process is frequently used to apply a lubricating coating of lead on the ball bearing cores.

The ion deposition process as described above suffers from several drawbacks, however. Lead, which is typically used in this process to form the lubricating coating, is thermally unstable and tends to dissipate at high temperatures. Thus, the lubricating coating may undesirably evaporate from the surface of the ball bearings during periods of tube operation where high temperatures are present within the bearing assembly. The lead gradually dissipates until the lubricating coating completely disappears and failure of the ball bearing set occurs. Though the ion deposition process has been used to attempt the application of materials other than lead directly to the ball bearing core, these attempts have proven unsatisfactory. For example, silver, which is a popular lubricating coating, has not been successfully applied directly to ball bearing cores using ion deposition because of the low adhesion that exists between silver and steel.

Another method that has been attempted in applying the lubricating coating to the metallic ball bearing core has involved a mechanical bonding process. In this process, a lubricating coating, typically comprising silver, is electroplated directly to the ball bearing core, which as described before, typically comprises steel or similar metallic substance. This forms a mechanical bond between the silver coating and the metallic core. However, several problems result from ball bearings made in this manner. First, the mechanical bond existing between the metallic core and the lubricating coating is a relatively low-strength bond. The relative weakness of the mechanical bond may cause the lubricating coating to flake away from the ball bearing when it is subjected to relatively small amounts of thermal or mechanical stress. As already discussed, an x-ray tube bearing assembly is a high vacuum environment, full of thermal and mechanical stress. Thus, this environment can readily cause a mechanically bonded lubricating coating to flake away from the ball bearing surface. This debris can then contaminate the ball bearing set, significantly increasing friction and wear within the ball bearing set, and leading to its premature failure.

The above situation is made worse when ball bearings having mechanically bonded lubricating coatings are employed in high power x-ray tubes. These high power x-ray tubes are capable of higher operating temperatures and longer operating times than standard x-ray tubes. This, in turn, results in increased mechanical and thermal stress of the bearing assembly and the ball bearing sets. Unfortunately, this additional stress serves only to increase the incidence of flaking of the ball bearing lubricating coatings.

In addition to the above problems, flaking of the lubricating coating from the ball bearing surface in x-ray tubes may also result in electrical arcing within the high electrical potential vacuum enclosure. This electrical arcing can cause severe electrical damage to and/or failure of x-ray tube components, and should be avoided.

Another drawback encountered with mechanically bonded lubricating coatings relates to the preparation work required to apply the lubricating coating during manufacture of the ball bearings. Before mechanically bonding the lubricating coating to the outer surface of the ball bearings, grit blasting of the metallic core is often necessary in order to prepare the outer surface for adhesion of the lubricating coating. In grit blasting, the surface of the ball bearings to be coated is blasted with high velocity bits of material, such as silicon oxide or other suitable material, in order to increase the surface area to enhance the adhesion of the coating to the surface. While effective at preparing the ball bearing core surface, grit blasting may also temporarily embed grits into the surface of the ball bearing. Later, during operation of the x-ray tube, these grits may work free from the ball bearing and contaminate the ball bearing set. As was the case with the flaking of the lubricating coating, this grit contamination significantly increases the friction and wear of the ball bearing set, and often results in premature failure of the bearing assembly.

Additionally, other problems exist when grit blasting is used to prepare the ball bearing surface for a mechanically bonded lubricating coating. Because of their relatively small size, ball bearings are difficult to uniformly grit blast. This results in ball bearings having portions of the outer surface where little or no grit blasting has occurred, thus preventing an adequate footprint to be formed in these areas. This results in poor adhesion between the outer surface of the ball bearing core and the lubricating coating that is applied thereon. Thus, the likelihood of flaking of the lubricating coating from such areas is significantly increased. The undesirable effects of such flaking have already been described.

Finally, because the surface of the ball bearing core is roughened by the grit blasting before mechanically applying the lubricating coating, the resulting coating possesses a less than optimally smooth surface. This undesirably results in greater noise and vibration with the bearing assembly during tube operation, which detracts from the overall performance of the x-ray tube.

What is needed, therefore, is a ball bearing that is manufactured so as to avoid the problems described above. In particular, a need exists for a ball bearing having a lubricating coating that is thermally and mechanically stable in high vacuum, high heat, and high rotational environments, such as those encountered in x-ray tubes. Such a lubricating coating should enable smooth operation of the ball bearing set within the bearing assembly. Further, the ball bearing should not suffer from flaking or other problems associated with previous techniques that apply the lubricating coating directly to the ball bearing core.

BRIEF SUMMARY OF EMBODIMENTS OF THE INVENTION

The present invention has been developed in response to the above and other needs in the art. Briefly summarized, embodiments of the present invention are directed to a lubricated ball bearing for use in bearing assemblies, especially those that are disposed in vacuum environments, such as an x-ray tube or other similar apparatus. The lubricated ball bearing features a permanently adhered lubricating coating that is thermally and mechanically stable. The thermal stability of the lubricating coating enables the ball bearing to withstand high temperatures that may be present within the bearing assembly during tube operation without evaporating or otherwise breaking down. Thus, the ball bearing is able to provide continuously smooth rotation of the x-ray tube anode, which is operably attached to the bearing assembly. The mechanical stability of the lubricating coating enables the ball bearing to withstand the high rotational and mechanical stress imposed upon it during tube operation without deformation or flaking of the coating. The lubricating coating also does not suffer from outgassing, which may compromise the integrity of the high vacuum environment of the x-ray tube. Silver is one preferred material for comprising the lubricating coating.

In order to provide the thermal and mechanical stability of the present ball bearing discussed above, an intermediate bonding layer is interposed between the lubricating coating and the outer surface of the core of the ball bearing. Preferably comprising nickel, the intermediate bonding layer allows a chemical, intermetallic bond to be formed between the intermediate bonding layer and the ball bearing core, as well as between the intermediate bonding layer and the outer lubricating coating. Thus, the interface between these materials is characterized by stronger chemical bonding as opposed to the relatively weaker mechanical bonding present in the prior art. Both the lubricating coating and the intermediate bonding layer may be applied to the ball bearing core via an electroplating process or other suitable method.

Because the lubricating coating is chemically bonded to the ball bearing instead of mechanically bonded to it, no grit blasting of the ball bearing core is necessary prior to application of the coating. Thus, risk of release of embedded grits from the ball bearing during tube operation is eliminated. Further, the elimination of grit blasting as a step in the manufacture of the present ball bearing allows it to be manufactured with a relatively smoother outer surface, thereby enabling the bearing assembly to operate with less noise and vibration.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1–4 depict various features of embodiments of the present invention, which is generally directed to lubricated ball bearings for use in a bearing assembly. In presently preferred embodiments, the bearing assembly comprises part of an x-ray tube within an x-ray generating device. In this configuration, the bearing assembly is disposed within the high vacuum environment of the x-ray tube. As such, traditional lubricating materials, such as grease or graphite, cannot be employed to lubricate the ball bearings. Rather, a permanent lubricating coating is disposed on the surface of the ball bearing. The lubricating coating features high thermal stability and mechanical strength such that the coating does not flake, spall, deform, or otherwise fail in the high heat, high vacuum environment of the x-ray tube during operation.

Figure 1:
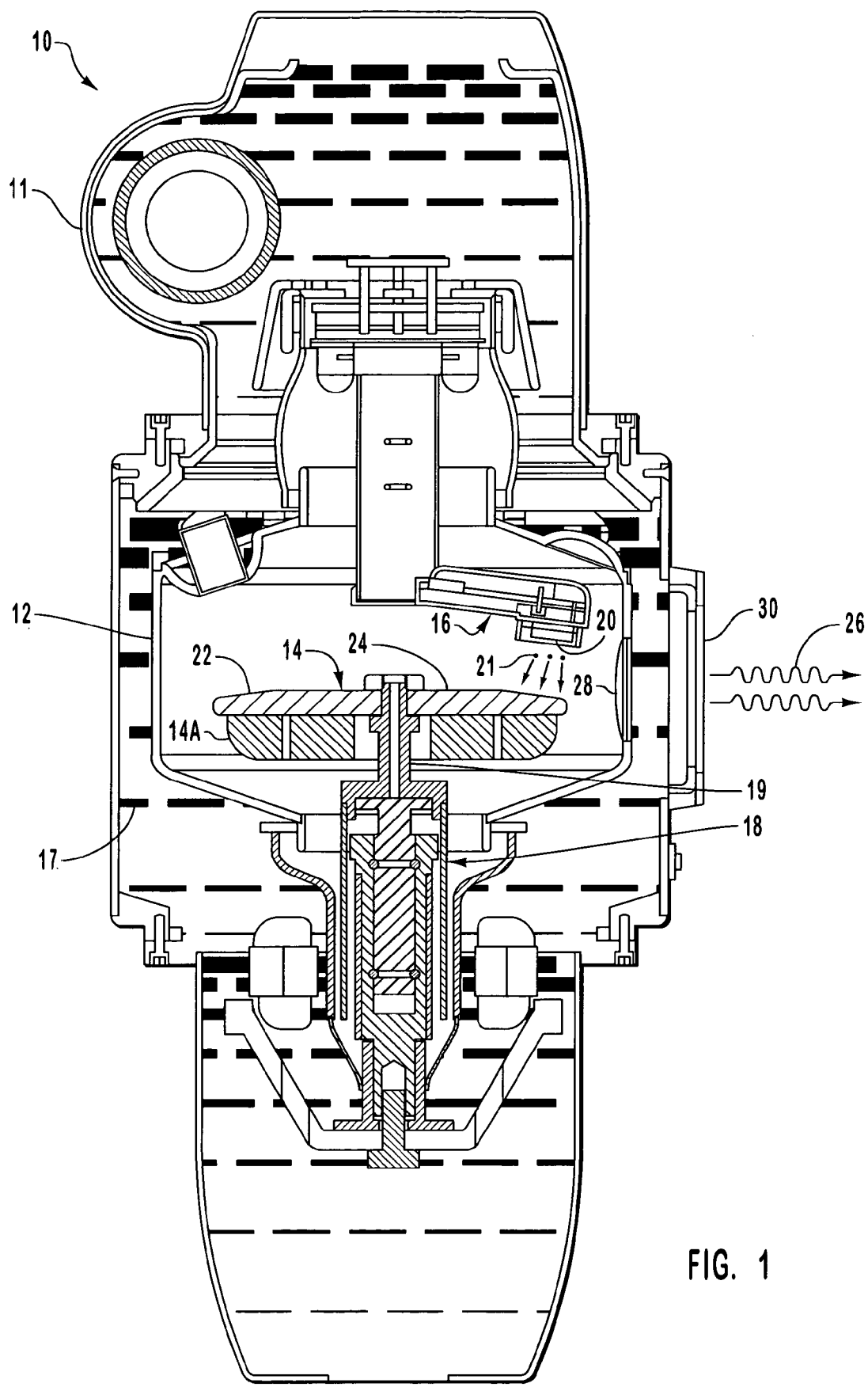
FIG. 1 is a cross-sectional view of a rotating anode x-ray tube, including a bearing assembly having lubricated ball bearings manufactured in accordance with one embodiment of the present claimed invention.

Reference is first made to FIG. 1, which illustrates a simplified structure of a conventional rotating anode-type x-ray tube, designated generally at 10. X-ray tube 10 includes an outer housing 11 enclosing an evacuated enclosure 12. The evacuated enclosure 12 has disposed therein a rotating anode 14 and a cathode 16. A coolant 17 commonly envelops and circulates within the outer housing 11 and around the evacuated enclosure 12 to assist in tube cooling. Anode 14 is spaced apart from and oppositely disposed to cathode 16. Anode 14 is typically composed of a thermally conductive material such as copper or a molybdenum alloy. Anode 14 may also comprise an additional portion 14A composed of graphite to assist in dissipating heat from the anode. A bearing assembly 18 is disposed in the evacuated enclosure 12 to rotatably support the rotating anode 14 via a rotor shaft 19. As is well known, cathode 16 includes a filament 20 that is connected to an appropriate power source. The anode 14 and cathode 16 are connected within an electrical circuit that allows for the application of a high voltage potential between the anode and the cathode. An electrical current passed through the filament 20 and causes a stream of electrons, designated at 21, to be emitted from the cathode 16 by thermionic emission. The high voltage differential between the anode 14 and the cathode 16 then causes electrons 21 to accelerate from cathode filament 20 toward a focal track 22 that is positioned on a target surface 24 of rotating anode 14. The focal track 22 is typically composed of tungsten or a similar material having a high atomic ("high Z") number. As the electrons 21 accelerate, they gain a substantial amount of kinetic energy. Upon approaching and interacting with the target material on the focal track 22, some of the electrons 21 convert their kinetic energy and either emit or cause to be emitted from the focal track material electromagnetic waves of very high frequency, i.e., x-rays. The resulting x-rays, designated at 26, emanate from the anode target surface 24 and are then collimated through windows 28 and 30 defined in the evacuated enclosure 12 and outer housing 11, respectively, for penetration into an object, such as an area of a patient's body. As is well known, the x-rays that pass through the object can be detected and analyzed so as to be used in any one of a number of applications, such as x-ray medical diagnostic examination or materials analysis procedures.

Figure 2:
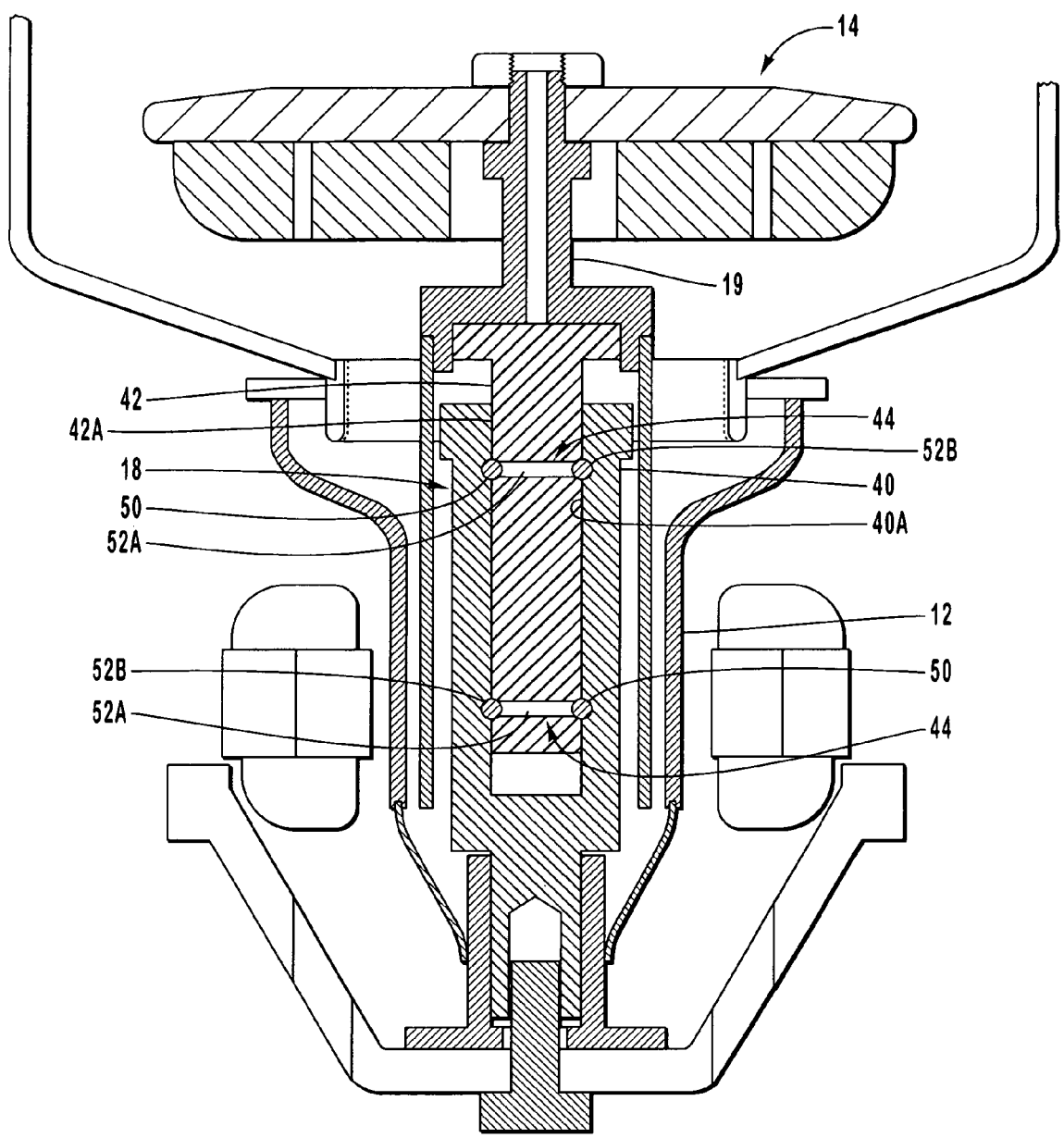
FIG. 2 is a close-up cross-sectional view of the bearing assembly of the x-ray tube of FIG. 1, showing various features of the present lubricated ball bearings.

Additional details concerning one presently preferred embodiment of the bearing assembly 18 are disclosed in FIG. 2. Though described herein in connection with an x-ray tube, the bearing assembly 18, including lubricating ball bearings manufactured in accordance with embodiments of the present invention, may be disposed and utilized in connection with various apparatus, particularly those in which the ball bearings are exposed to a vacuum environment.

In one embodiment, the bearing assembly 18 generally comprises a bearing housing 40, a bearing shaft 42 rotatably disposed within the bearing housing 40, and two ball bearing sets 44. The ball bearing sets 44 are interposed between an inner surface 40A of the bearing housing 40 and an outer surface 42A of the bearing shaft 42 so as to permit free rotation of the bearing shaft. The bearing shaft 42 is connected in turn to the rotor shaft 19 so as to permit the anode 14 to rotate during tube operation. While the bearing shaft 42 is described herein as rotating within the bearing housing 40, it is also appreciated that the bearing assembly 18 could be configured such that the bearing housing 40 rotates about the bearing shaft 42.

Each ball bearing set 44 comprises a plurality of spherical, lubricated ball bearings 50 that are manufactured in accordance with one presently preferred embodiment of the present invention. The ball bearings 50 in each ball bearing set 44 are disposed within tracks, or races 52A and 52B, so as to contain the ball bearings. In the illustrated embodiment, inner and outer races 52A and 52B are disposed on the outer surface 42A of the bearing shaft 42 and the inner surface 40A of the bearing housing 40, respectively. Alternatively, the outer race 52B can be defined on a bearing ring that is interposed between the bearing housing 40 and the ball bearings 50.

As already suggested, the races 52A and 52B serve to establish and maintain the radial and axial positioning of the bearing sets 44, as well as the bearing shaft 42. The races 52A and 52B confine the respective sets of lubricated ball bearings 50 in each ball bearing set 44. Generally, this arrangement permits motion of the ball bearings 50 about the circumference of the bearing shaft 42, but prevents significant axial motion of the balls. As a result, the bearing shaft 42 is able to rotate, thereby enabling the rotation of the rotor shaft 19 and the anode 14. Preferably, no more than eight (8) ball bearings 50 are disposed in each ball bearing set 44 in order to minimize collisions between the balls, thereby minimizing noise and vibration within the bearing assembly 18. However, alternative numbers of ball bearings 50 may be employed. Similarly, more than two ball bearing sets 44 may be employed in the bearing assembly 18, and such ball bearing sets may include components that are distinct from those described above. The above description is therefore not meant to limit the present invention in any way.

Figure 3:
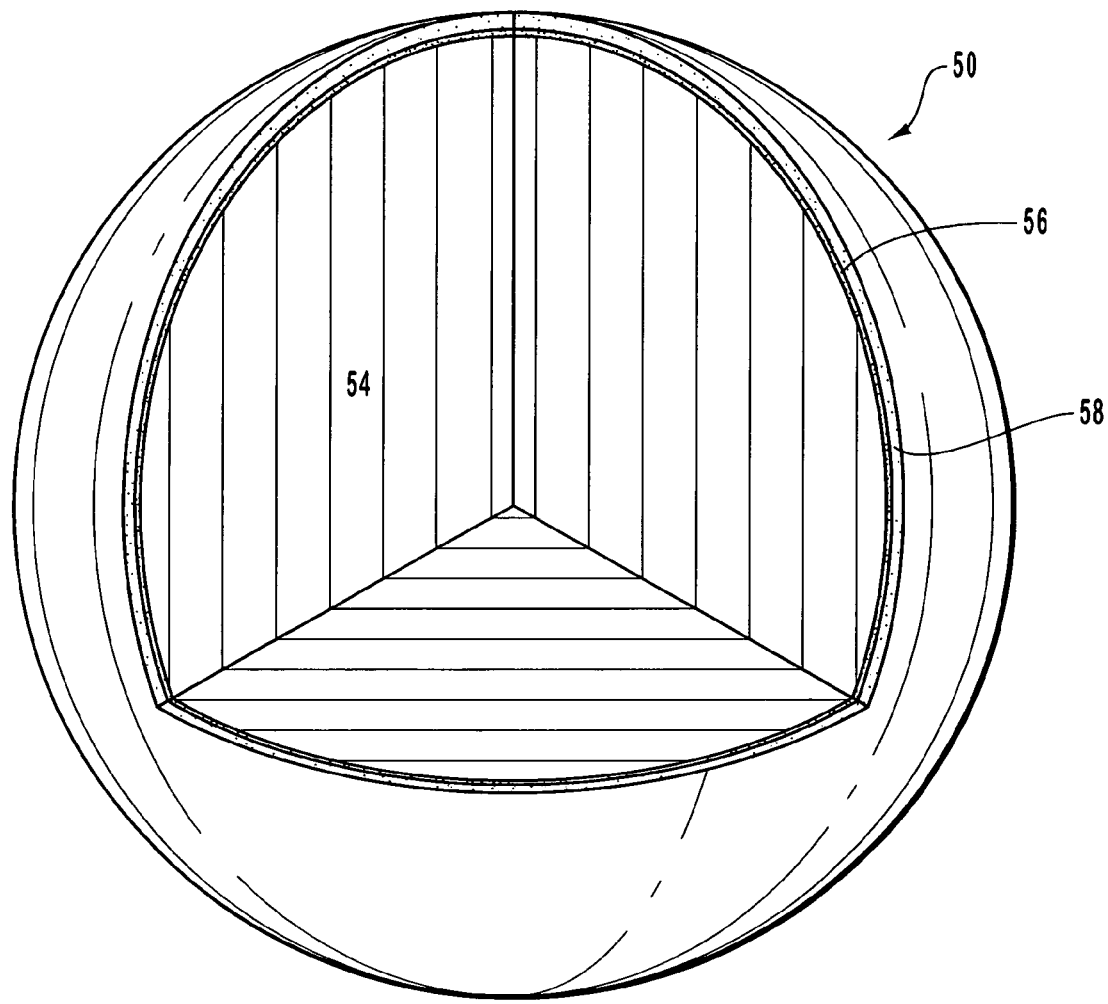
FIG. 3 is a partial cutaway view of the lubricated ball bearing manufactured in accordance with one embodiment of the present invention.

Reference is now made to FIG. 3, which depicts one lubricated ball bearing 50 made in accordance with one presently preferred embodiment of the present invention. The ball bearing 50 shown in FIG. 3 comprises one of a plurality of ball bearings that together comprise each ball bearing set 44 shown in FIG. 2.

As already suggested, each ball bearing 50, in order to properly function within each ball bearing set 44, should possess certain characteristics. First, the ball bearing 50 should be lubricated so as to enable free rotation of the bearing shaft 42 during tube operation. Any lubricating coating applied to the ball bearing 50 should be able to withstand the mechanical stresses imposed upon the ball bearing during tube operation. Additionally, the lubricating coating should be able to withstand thermal stress resulting from the high temperatures experienced by the bearing assembly 18 within the tube without flaking, melting, or alloying with other ball materials. Further, the ball bearing 50 should comprise a uniform outer surface so as to enable smooth rotation of the ball bearing 50 within the races 52A and 52B of the ball bearing set 44, thereby reducing noise and vibration within the bearing assembly 18 during tube operation.

The ball bearing 50 as shown in FIG. 3 is manufactured to meet the above requirements. The ball bearing 50 is suitable for operation within bearing assemblies disposed in a variety of apparatus, but particularly for operation with a vacuum environment, where other lubricants, such as grease or graphite, cannot be utilized.

The ball bearing 50, according to one presently preferred embodiment, includes a core 54 comprised of a metallic material, such as tool steel. Alternatively, other materials can comprise the core 54, including tungsten carbide and some ceramic materials. The core 54 is manufactured to comprise a uniformly spherical surface.

As shown in FIG. 3, an intermediate bonding layer 56 is disposed on the entire outer surface of the core 54. The intermediate bonding layer 56 is applied to the ball core 54 in order to provide a suitable surface upon which a lubricating coating for the ball bearing may be applied. The intermediate bonding layer 56 is preferably applied using an electroplating process. Alternatively, other application methods could be used to apply the intermediate bonding layer 56 to the core 54, including vapor and ion deposition methods. The interface existing between the intermediate bonding layer 56 and the core 54 comprises an intermediate bond. This intermetallic bond forms a chemical junction between the two materials, such that a high strength connection between the two materials is achieved. This intermetallic bond is both thermally and mechanically stable so as to prevent future problems with layer adhesion.

In accordance with the above, the intermediate bonding layer 56 should possess certain characteristics. First, the intermediate bonding layer 56, as applied to the core 54, should comprise an amorphous, rather than a crystalline, molecular structure. This helps to improve the smoothness of the intermediate bonding layer 56, as well as to eliminate the chance of fracture of the bonding layer along crystalline faces that would otherwise be present, which could lead to failure of the layer. The intermediate bonding layer 56 should also possess mechanical properties sufficient to support the bearing load and stress imposed upon the ball bearing 50 during rotational operation of the bearing assembly 18. The intermediate bonding layer 56 should also comprise a material that is able to withstand the high vacuum, high heat environment present within the bearing assembly 18 during tube operation without degrading or outgassing, should possess a sufficiently low vapor pressure, and should avoid forming low temperature alloys with other ball materials. Finally, the material from which the intermediate bonding layer 56 is comprised should be capable of forming intermetallic, chemical bonds not only with the core 54, but also with a lubricating coating to be applied atop the intermediate bonding layer 56, as described below.

In one presently preferred embodiment, the intermediate bonding layer 56 comprises nickel, such as a bright nickel plating formed on the ball core 54 via an electroplating process. Nickel forms a mechanically and thermally stable bonding layer on the core 54 of the ball bearing 50, and meets all of the other desired characteristics outlined above. In alternative embodiments, however, it is appreciated that other materials may comprise the intermediate bonding layer 56. These alternative materials include, but are not limited to several group VIII elements, including ruthenium, osmium, cobalt, rhenium, iridium, palladium, and platinum.

As suggested above, one feature of the intermediate bonding layer 56 is its ability to intermetallically bond not only with the material comprising the core 54 of the ball bearing 50, but also with a lubricating coating that is applied atop the intermediate bonding layer. These intermetallic bonds are preferably formed via an electroplating process that deposits the intermediate bonding layer 56 and the lubricating coating onto the core 54 of the ball bearing 50. An exemplary electroplating process is described further below; however, it is appreciated that other application methods may also be utilized in applying these coatings.

The thickness of the intermediate bonding layer 56 should be sufficient so as to provide a suitable bonding surface for a lubricating coating to be applied thereon, while being thin enough so as not to deform easily when placed under mechanical stress. In presently preferred embodiments, the thickness of the intermediate bonding layer 56 does not exceed 400 angstroms, though this thickness may be varied according to the particular application in which the ball bearings 50 are placed.

When properly applied to the surface of the core 54, the intermediate bonding layer 56 provides a suitable bonding surface for a lubricating coating, as suggested above. This, in turn, ensures high strength bonding of the lubricating coating, which reduces or eliminates flaking or degrading of the lubricating coating, while providing a higher strength lubricating coating than what is possible with coatings that are applied directly to the ball core material.

A lubricating coating 58 is applied atop the intermediate bonding layer 56 of the ball bearing 50, as seen in FIG. 3. The lubricating coating 58, when applied in accordance with presently preferred embodiments of the present invention, forms an intermetallic, chemical bond with the intermediate bonding layer 56. This chemical bonding enables the lubricating coating 58 to securely adhere to the ball bearing 50, thus reducing the risk of flaking or spalling of the coating. Thus, the intermediate bonding layer is presently preferred embodiments serves as a means for chemically bonding the lubricating coating 58 to the ball bearing core 54. The lubricating coating 58 is also selected so as to withstand the high temperature, high vacuum environment in which the bearing assembly 18 is disposed, so as to prevent evaporation, dissipation, or outgassing of the lubricating coating during operation of the x-ray tube 10. The lubricating coating 58 also features high strength such that it is able to withstand the mechanical stresses imposed upon the ball bearing 50 during tube operation.

In accordance with the above, the lubricating coating should possess various characteristics. First, the lubricating coating 58, as applied atop the intermediate bonding layer 56, should possess an amorphous molecular structure. In addition to improving its smoothness, the amorphous nature of the lubricating coating 58 enables the ball bearing 50 to endure relatively greater amounts of stress without fracturing along crystalline faces that would otherwise be present within the coating. The lubricating coating 58 should also comprise a material that enables the coating to possess sufficient mechanical strength to support the varying loads imposed upon the bearing assembly during tube operation 10, and to endure the high vacuum, high heat environment of the x-ray tube, as suggested above. Additionally, the lubricating coating 58 should comprise a material that possesses a sufficiently low vapor pressure, and that does not easily form low temperature alloys with other ball constituents, such as the ball core 54 or the intermediate bonding layer 56. It is also desirable that the material comprising the lubricating coating 58 possesses characteristics that give the coating a low diffusion bonding preference to the material comprising the inner and outer races 52A and 52B of the ball bearing sets 44. For example, in one presently preferred embodiment, the inner and outer races 52A and 52B are defined on the outer surface 42A of the bearing shaft 42 and the inner surface 40A of the bearing housing 40, respectively. These components are often comprised of steel. Thus, an ideal lubricating coating 58 would have low diffusion bond preference to steel, as applied to this situation.

In one presently preferred embodiment, the lubricating coating 58 comprises silver, which readily forms an intermetallic bond with nickel as the intermediate bonding layer 56, and which meets all of the other desired characteristics as outlined above. Indeed, the utilization of silver as the lubricating coating 58 and nickel as the intermediate bonding layer 56 satisfies the desired characteristics of both the bonding layer and the lubricating coating. Alternatively, however, other materials, such as gold and palladium, can also be acceptably employed as the lubricating coating 58. As with the intermediate bonding layer 56, the lubricating coating 58 can be applied to the ball bearing 50 via an electroplating process described below, or by other suitable methods.

Because the applied lubricating coating 58, which forms the outer surface of the ball bearing 50 comprises a preferably amorphous molecular structure, the outer surface is substantially smooth, thereby enabling the ball to roll smoothly within the ball bearing set 44. This, in turn, reduces friction, which produces additional heat within the bearing set 44, and creates less noise and vibration during tube operation. The intermetallic, chemical bond existing between the intermediate bonding layer 56 and the lubricated coating 58 is also high strength, which reduces the likelihood of flaking of the lubricating coating from the ball bearing 50 during periods of mechanical or thermal stress. The reduction of flaking further improves bearing performance in terms of friction, noise, and vibration. As has been described, these flakes can otherwise hasten the degradation of the ball bearing set 44 and shorten the operational life of the bearing assembly 18.

Figure 4:
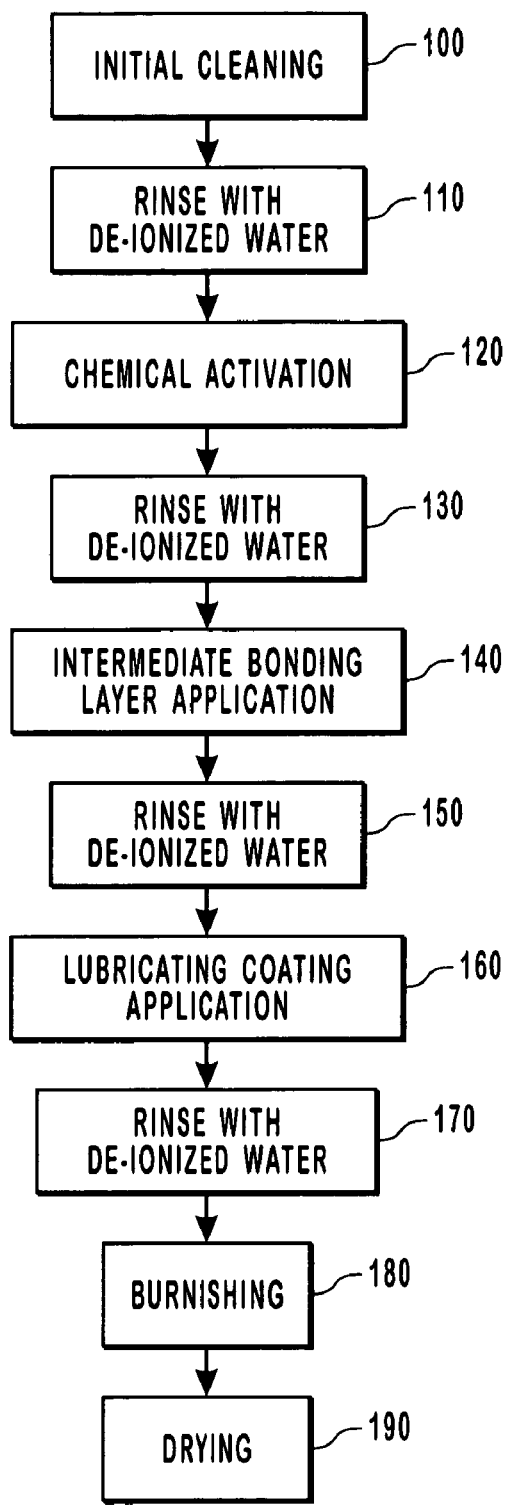
FIG. 4 is a flow chart representing the various steps for manufacturing the present lubricated ball bearings according to one embodiment of the present invention.

Reference is now made to FIG. 4, which shows a flow chart illustrating various steps involved in applying both the intermediate bonding layer 56 and the lubricating coating 58 to one or more bearing balls 50, according to one presently preferred embodiment. The illustrated method employs an electroplating process to apply these coatings. However, it is appreciated that other methods of application can also be used to apply the both the intermediate bonding layer 56 and the lubricating coating 58. Examples of such other methods include, but are not limited to, vapor deposition and ion deposition methods.

In brief, electroplating produces a metallic coating on a surface by means of electrodeposition, which is deposition by the action of an electric current. In a typical electroplating process, the article to be plated is first cleaned of any grease or dirt by washing it with an acid or other cleaning solution. The article to be plated is then placed in a solution comprising the metal with which the article will be plated. The metallic solution primarily comprises positive ions of the metal. A negative electrical source is connected to the article to be plated, which serves as the electroplating cathode. A positive electrical source is connected to an electroplating anode which is put into contact with the metallic solution, and which also provides the source of metallic ions to be plated to the article. The electric current that flows between the anode and the cathode acts on the metallic ions in the solution and causes them to be attracted to the cathode (article), thereby causing an electroplating coating to be deposited on the surface of the article. Using this electroplating process, plating layers of various thicknesses may be applied to the article, according to the strength of the electric current, the metallic concentration of the solution, and the time that the article is kept in the solution. The present invention employs a similar electroplating process, as described below, to deposit the intermediate bonding layer 56 and the lubricating coating 58 on ball bearings 50.

A plurality of ball bearings 50, each initially comprising only the ball bearing core 54, is typically electroplated at one time in order to dispose the desired coatings thereon. To do this, the plurality of ball bearing cores 54 is retained in a mesh barrel or other suitable holding device. The barrel is then immersed during the electroplating process into the various solutions used in the process, thereby also immersing the ball bearing cores. The barrel rotates at a specified rotational rate during the electroplating process to maintain constant relative movement between the ball bearing cores 54 with respect to one another, which helps to ensure uniform plating of each core. In the present embodiment, 300 or more ball bearing cores 54 may be plated at one time by the electroplating process described herein, though more or less than this is also acceptable.

The ball bearing cores 54, serving as the electroplating cathode, are placed in negative electrical contact with an electric current, such that they are able to attract the metallic ions to the ball bearing cores in order to plate them. The anode serves as the source of the metallic ions, as is known in the art. To this end, both the anode and the ball bearing cores 54 are electrically connected to an appropriate power source so as to provide the above action of the metallic ions. It is appreciated that various details regarding both the electroplating apparatus and its operation are known in the art. Thus, the following method for applying the intermediate bonding layer 56 and lubricating coating 58 can be performed by an electroplating apparatus that is operated according to the manufacturer's specifications so that electroplating parameters such as plating time, temperature, solution composition, solution concentration, etc., are specified as appreciated by one skilled in the art. Alternatively, such details may also be modified to suit a particular ball bearing application or to achieve an optimum coating for the ball bearings 50.

As mentioned above, the strength of the electric current used in the electroplating process partially determines the thickness and quality of the layers applied to the article. Current density is one quantity by which the strength of the electric current may be determined. Current density is a measure of the amount of current flowing to or from a unit area of the electroplating anode or cathode, and is typically expressed in amperes ("amps") per square foot. In a presently preferred embodiment, the strength of the electrical current used to apply the intermediate bonding layer 56 and the lubricating coating 58 is determined by multiplying the surface area of the ball bearing cores 54 contained in the barrel by the required current density. As a non-limiting example, if the collective surface area of the ball bearing cores 54 to be plated comprises 18 square feet, this figure is multiplied by the desired current density, such as 20 amps per square foot, thereby yielding a desired current strength for the electroplating process of approximately 360 amps.

Various steps for applying the intermediate bonding layer 56 and lubricating coating 58 to the ball bearing core 54 are given here. In one presently preferred embodiment, step 100 comprises initially cleaning the ball bearing cores 54 in order to remove any impurities, and to degrease the cores. This cleaning step may be performed by immersing the one or more ball bearing cores 54 in a high caustic solution for a predetermined amount of time while rotating the barrel in which the cores are disposed. This barrel rotation is performed by succeeding steps as well, and so is not discussed further hereinafter.

After step 100 is complete, step 110 is be performed, which comprises rinsing the ball bearing cores 54 with de-ionized water for a predetermined amount of time.

In step 120, the ball bearing cores 54 to be plated are chemically activated in preparation for receiving the intermediate bonding layer 56. To do this, step 120 includes immersing the ball bearing cores 54 in an acidic solution, such as a hydrochloric acid solution, for a predetermined amount of time. This step prepares the surfaces of the ball bearing cores 54 to chemically interact with the electroplating solution that will be used to deposit the intermediate bonding layer 56. Thus, step 120 activates the surface of the ball bearing cores 54, changing them from a chemically passive state to a chemically active state.

In addition to chemically activating the surface of the ball bearing cores 54, step 120 also removes any oxides that may be present on the surfaces. These oxides may interfere with the application of the intermediate bonding layer 56. As such, the removal of these oxides is preferable before proceeding with the electroplating process. Once step 120 is complete, step 130 is performed, which includes a rinsing operation with de-ionized water for a predetermined amount of time, similar to the rinsing performed in step 110.

Step 140 includes the application of the intermediate bonding layer 56, preferably comprising nickel, to the surfaces of the ball bearing cores 54. In this step, the ball bearing cores 54 are immersed in a metallic solution containing nickel ions. The nickel-containing solution may comprise nickel sulphamate, or other appropriate solution. An electric current of a specified current strength is supplied between the anode and the cathode of the electroplating apparatus to attract and plate the nickel ions to the surfaces of the ball bearing cores 54. As a result of step 140, a bright nickel coating is preferably applied to the surfaces of the ball bearing cores 54 to comprise the intermediate bonding layer 56. This layer of bright nickel is preferably amorphous so as to prove the smoothness and adhesion characteristics of the intermediate bonding layer 56. Generally speaking, lower electric current strength and longer solution immersion times during this electroplating step achieve a more amorphous bright nickel coating upon the surfaces of the ball bearing cores 54. In one embodiment, a rapid pulse technique for supplying the electric current to the electroplating solution in short electrical pulses is also beneficial for providing a more amorphous and uniform intermediate bonding layer 56.

As discussed above, the thickness of the intermediate bonding layer 56 should be sufficient to provide an adequate bonding surface for the lubricating coating 58, but thin enough so as not to compromise the mechanical strength of the lubricating coating. In one presently preferred embodiment, therefore, the intermediate bonding layer 56 is applied to a thickness in a range of about 10 to 400 angstroms. Step 140 may further include measuring the thickness of the intermediate bonding layer 56 after its application on the ball bearing cores 54 to ensure that an appropriate thickness has been achieved. After completion of step 140, step 150 includes rinsing the coated ball bearing cores 54 with de-ionized water for a specified amount of time.

In step 160, the lubricating coating 58 is applied atop the intermediate bonding layer 56 on the ball bearing cores 54. In presently preferred embodiments, the lubricating coating 58 comprises silver. In similar fashion to the process described in step 140 in connection with application of the intermediate bonding layer 56, the lubricating coating 58 is applied atop the intermediate bonding layer. To do this, step 160 includes immersing the ball bearing cores 54 in a silver-ion-containing electroplating solution while applying a specified electric current between the cathode and the anode. The silver ions contained within the silver-containing electroplating solution are attracted and adhere to the ball bearing cores 54 having the intermediate bonding layer 56 already applied thereto.

As a result of step 160, a thermally and mechanically stable lubricating coating 58 is disposed on the ball bearing cores 54 atop the intermediate bonding layer 56. As has already been described, the interface between the surface of the core 54 and the intermediate bonding layer 56, as well as the interface between the intermediate bonding layer and the lubricating coating 58, is characterized by an intermetallic, chemical bond that features high strength and thermal stability qualities, which are highly desirable in ball bearing applications involving high vacuum environments. Step 160 includes applying the lubricating coating 58 to a sufficient thickness, which is preferably within a range of about 1,000 to 1,500 angstroms in presently preferred embodiments. As in step 140, step 160 may include the act of accurately measuring the thickness of the lubricating coating 58 as applied to the ball bearing cores 54 in order to ensure that sufficient thickness has been applied. Step 160 further includes applying the lubricating coating 58 such that its molecular structure is amorphous, thus adding to its structural integrity and mechanical strength, while improving the overall smoothness of the finished ball bearing 50. As described in connection with step 140, this may include applying a relatively small electric current via rapid pulse techniques between the cathode and the anode during step 160, while increasing the relative time that the ball bearing cores 54 are immersed in the electroplating solution. Following the application of the lubricating coating 58 in step 160, step 170 includes one or more rinsing operations with de-ionized water, and may include at least one rinsing with hot de-ionized water.

Step 180 includes burnishing the finished ball bearings 50 by tumbling or similar process in order to polish the balls, thereby removing any surface roughness. Further rinsing may be performed in step 190, after which step 200 is performed which includes drying the ball bearings 50 in a nitrogen environment, a vacuum environment, or in other appropriate conditions. The finished ball bearings 50 may then be stored in a non-oxidizing atmosphere until ready for placement within the ball bearing sets 44 of the bearing assembly 18.

It is appreciated that the above steps have been described in connection with one presently preferred embodiment disclosing a method for forming various coatings on ball bearings. However, it should be appreciated that variations to the above method may be employed while still residing within the present invention. For instance, additional steps may be added to further process the ball bearings. Also, the time of application, concentrations, and compositions of the various solutions used in the above method may be varied as to suit a particular application. Finally, it is appreciated that other coatings may also be disposed on the ball bearings 50, either in conjunction with or instead of the intermediate bonding layer 56 and lubricating coating 58.

In one alternative embodiment, ball bearings 50 having a lubricating coating 58 comprising one material, such as silver, may be disposed in the ball bearing set 44 with ball bearings having a lubricating coating comprising a different material, such as palladium. These ball bearings 50 are placed in alternativing fashion in the bearing set 44 such that a ball bearing having a silver coating is interposed between two palladium-coated ball bearings, and visa versa. Such a configuration may be desirable to lower the likelihood of the diffusion bonding, not only between the respective ball bearing and the race in which it resides, but also between adjacent ball bearings as well.

Though the above discussion has focused on implementation of the present invention in connection with ball-bearing-type bearing sets, the principles taught herein may also be applied to other types of bearing sets as well. For example, roller bearing sets, having cylindrical roller bearings disposed therein, could benefit from a lubricating coating applied to the roller bearings in accordance with the above disclosure. Generally, bearing sets and other components that require a thermally or mechanically stable lubricating surface, especially when disposed in a vacuum environment, may benefit from practice of the present invention.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. In a bearing assembly comprising at least one bearing set, a lubricated ball bearing disposed in the at least one bearing set, the lubricated ball bearing comprising:
   a core;
   a lubricating coating applied to the ball bearing, the lubricating coating having a thickness that does not exceed approximately 1500 angstroms; and
   an intermediate bonding layer formed as a single layer that substantially covers the core so as to be interposed between the core and the lubricating coating, the intermediate bonding layer substantially comprising material selected from a group that includes: ruthenium; osmium; cobalt; rhenium; iridium; palladium; nickel; and platinum, and the intermediate bonding layer having a thickness that does not exceed approximately 400 angstroms.

2. A lubricated ball bearing as defined in claim 1, wherein the intermediate bonding layer substantially prevents the lubricating coating from deforming or flaking during operation of the bearing assembly.

3. A lubricated ball bearing as defined in claim 1, wherein the materials that comprise both the intermediate bonding layer and the lubricating coating have substantially amorphous molecular structures.

4. A lubricated ball bearing as defined in claim 1, wherein chemical bonds existing both between the core and the intermediate bonding layer and between the intermediate bonding layer and the lubricating coating comprise intermetallic interfaces.

5. A lubricated ball bearing as defined in claim 1, wherein the bearing assembly is disposed in a vacuum environment.

6. The lubricated ball bearing as recited in claim 1, wherein the core substantially comprises one of: ceramic; and, tungsten carbide.

7. The lubricated ball bearing as recited in claim 1, wherein the intermediate bonding layer comprises a vapor deposited intermediate bonding layer.

8. The lubricated ball bearing as recited in claim 1, wherein the lubricating coating substantially comprises one of: gold; silver; and, palladium.

9. The lubricated ball bearing as recited in claim 1, wherein the intermediate bonding layer is substantially resistant to the formation of alloys with the core and the lubricating coating.

10. An x-ray tube, comprising:
    a vacuum enclosure having disposed therein an electron-emitting cathode and an anode positioned to receive electrons emitted by the cathode; and
    a bearing assembly rotatably supporting the anode, the bearing assembly comprising at least two bearing sets, each bearing set including a plurality of ball bearings, at least one ball bearing of the plurality of each bearing set comprising:
    a metallic core;
    a first coating applied to the metallic core, the first coating having a thickness falling in a range of about 10 angstroms to about 400 angstroms; and
    a second coating applied to the first coating, the second coating comprising a lubricating surface for the ball bearing and having a thickness falling in a range of about 1000 angstroms to about 1500 angstroms.

11. An x-ray tube as defined in claim 10, wherein the second coating is applied atop the first coating such that the material comprising the second coating has a substantially amorphous molecular structure.

12. An x-ray tube as defined in claim 10, wherein an intermetallic interface exists between the first coating and the second coating.

13. An x-ray tube as defined in claim 10, wherein the first and second coatings are applied via an electroplating process.

14. An x-ray tube as defined in claim 10, wherein the first coating comprises a material selected from a group that includes: nickel; ruthenium; osmium; cobalt; rhenium; iridium; palladium; and platinum.

15. An x-ray tube as defined in claim 10, wherein the second coating comprises a material selected from group that includes: silver; gold; and palladium.

16. The x-ray tube as recited in claim 10, wherein the metallic core substantially comprises steel.

17. The x-ray tube as recited in claim 10, wherein the first coating substantially comprises nickel.

18. The x-ray tube as recited in claim 10, wherein the second coating substantially comprises silver.

19. A bearing set comprising:
   a first plurality of ball bearings, each bearing ball of the first plurality of ball bearings comprising:
      a first core;
      a first intermediate bonding layer substantially covering the first core; and
      a first lubricating coating substantially covering the first intermediate bonding layer; and
   a second plurality of ball bearings, each bearing ball of the second plurality of ball bearings comprising:
      a second core;
      a second intermediate bonding layer substantially covering the second core; and
      a second lubricating coating substantially covering the second intermediate bonding layer, the second lubricating coating being different from the first lubricating coating.

20. A bearing set as defined in claim 19, wherein the materials that comprise both the first and second intermediate bonding layers and the first and second lubricating coatings have substantially amorphous molecular structures.

21. A bearing set as defined in claim 19, wherein the thickness of each of the first and second intermediate bonding layers does not exceed 400 angstroms, and wherein the thickness of each of the first and second lubricating coatings does not exceed 1,500 angstroms.

22. A bearing set as defined in claim 19, wherein the bearing set is disposed in an x-ray generating device.

23. The bearing set as recited in claim 19, wherein at least one of the first and second cores substantially comprises steel.

24. The bearing set as recited in claim 19, wherein at least one of the first and second intermediate bonding layers substantially comprises nickel.

25. The bearing set as recited in claim 19, wherein the first lubricating layer substantially comprises silver and the second lubricating layer substantially comprises palladium.

26. The bearing set as recited in claim 19, wherein the respective ball bearings of the first and second pluralities of ball bearings are arranged in alternating fashion, so that a ball bearing of the first plurality of ball bearings is disposed adjacent to two ball bearings of the second plurality of ball bearings.

27. A bearing set having a plurality of bearing balls, each of the bearing balls comprising:
   a metallic core substantially comprising steel;
   an intermediate bonding layer applied to the metallic core, the intermediate bonding layer having a thickness falling in a range of about 10 angstroms to about 400 angstroms and substantially comprising one of: nickel; ruthenium; osmium; cobalt; rhenium; iridium; palladium; and, platinum; and
   a lubricating coating applied to the first coating, the lubricating coating having a thickness falling in a range of about 1000 angstroms to about 1500 angstroms and substantially comprising one of: silver; gold; and, palladium.

28. A bearing set having a plurality of bearing balls, at least one of the balls comprising:
   a core that is one of: substantially non-ferrous; or, substantially non-metallic
   an intermediate bonding layer that substantially covers the core, wherein the intermediate bonding layer substantially comprises material selected from a group that includes: ruthenium; osmium; cobalt; rhenium; iridium; palladium; and platinum; and
   a lubricating coating that substantially covers the intermediate bonding layer.

29. The bearing set as recited in claim 28, wherein the core comprises ceramic material.

30. The bearing set as recited in claim 28, wherein the core comprises tungsten carbide.

31. The bearing set as recited in claim 28, wherein the intermediate bonding layer is chemically bonded to the lubricating coating.

32. A bearing set having a plurality of bearing balls, at least one of the balls comprising:
   a core that is one of: substantially non-ferrous; or, substantially non-metallic
   an intermediate bonding layer that substantially covers the core; and
   a lubricating coating that substantially covers the intermediate bonding layer, wherein the lubricating coating substantially comprises one of: gold; silver; and, palladium.

33. The bearing set as recited in claim 32, wherein the core comprises ceramic material.

34. The bearing set as recited in claim 32, wherein the core comprises tungsten carbide.

35. The bearing set as recited in claim 32, wherein the intermediate bonding layer is chemically bonded to the lubricating coating.

36. A bearing set having a plurality of bearing balls, each of the bearing balls comprising:
   a metallic core;
   an intermediate bonding layer applied to the metallic core, the intermediate bonding layer substantially comprising one of: ruthenium; osmium; cobalt; rhenium; iridium; palladium; and platinum; and
   a lubricating coating applied to the intermediate bonding layer, the lubricating coating substantially comprising palladium.

37. A bearing set having a plurality of bearing balls, each of the bearing balls comprising:
   a metallic core;
   an intermediate bonding layer applied to the metallic core, the intermediate bonding layer substantially comprising one of: ruthenium; osmium; cobalt; rhenium; iridium; palladium; and platinum; and
   a lubricating coating applied to the intermediate bonding layer, the lubricating coating substantially comprising silver.

38. A bearing set having a plurality of bearing balls, each of the bearing balls comprising:
   a metallic core;
   an intermediate bonding layer applied to the metallic core, the intermediate bonding layer substantially comprising one of: ruthenium; osmium; cobalt; rhenium; iridium; palladium; and platinum; and
   a lubricating coating applied to the intermediate bonding layer, the lubricating coating substantially comprising gold.

* * * * *

UNITED STATES PATENT AND TRADEMARK OFFICE
CERTIFICATE OF CORRECTION

PATENT NO.        : 7,004,635 B1                                                      Page 1 of 1
APPLICATION NO. : 10/150171
DATED             : February 28, 2006
INVENTOR(S)       : Smith et al.

It is certified that error appears in the above-identified patent and that said Letters Patent is hereby corrected as shown below:

Column 2
Line 20, change "stress" to --stresses--

Column 7
Line 45, after "operation" change "with" to --within--
Line 64, before "bond" change "intermediate" to --intermetallic--

Column 9
Line 6, before "presently" change "is" to --in--

Column 10
Line 17, after "apply" remove [the]
Line 18, change "such other" to --other such--

Column 12
Line 4, after "appropriate" change "solution" to --solutions--

Column 13
Line 42, change "alternativing" to --alternating--

Column 14
Line 40, change "and, palladium" to --and palladium--

Column 15
Line 65, change "and, platinum" to --and platinum--

Column 16
Line 7, change "non-metallic" to --non-metallic;--
Line 24, change "non-metallic" to --non-metallic;--
Line 28, change "and, palladium" to --and palladium--

Signed and Sealed this

Twenty-third Day of November, 2010

David J. Kappos
*Director of the United States Patent and Trademark Office*